Jan. 2, 1968  R. M. BUCHWALD  3,361,000
COMPACT SPEED CHANGE DRIVE

Filed Dec. 21, 1965  2 Sheets-Sheet 1

INVENTOR.
Robert M. Buchwald
BY
Robert J. Outland
ATTORNEY

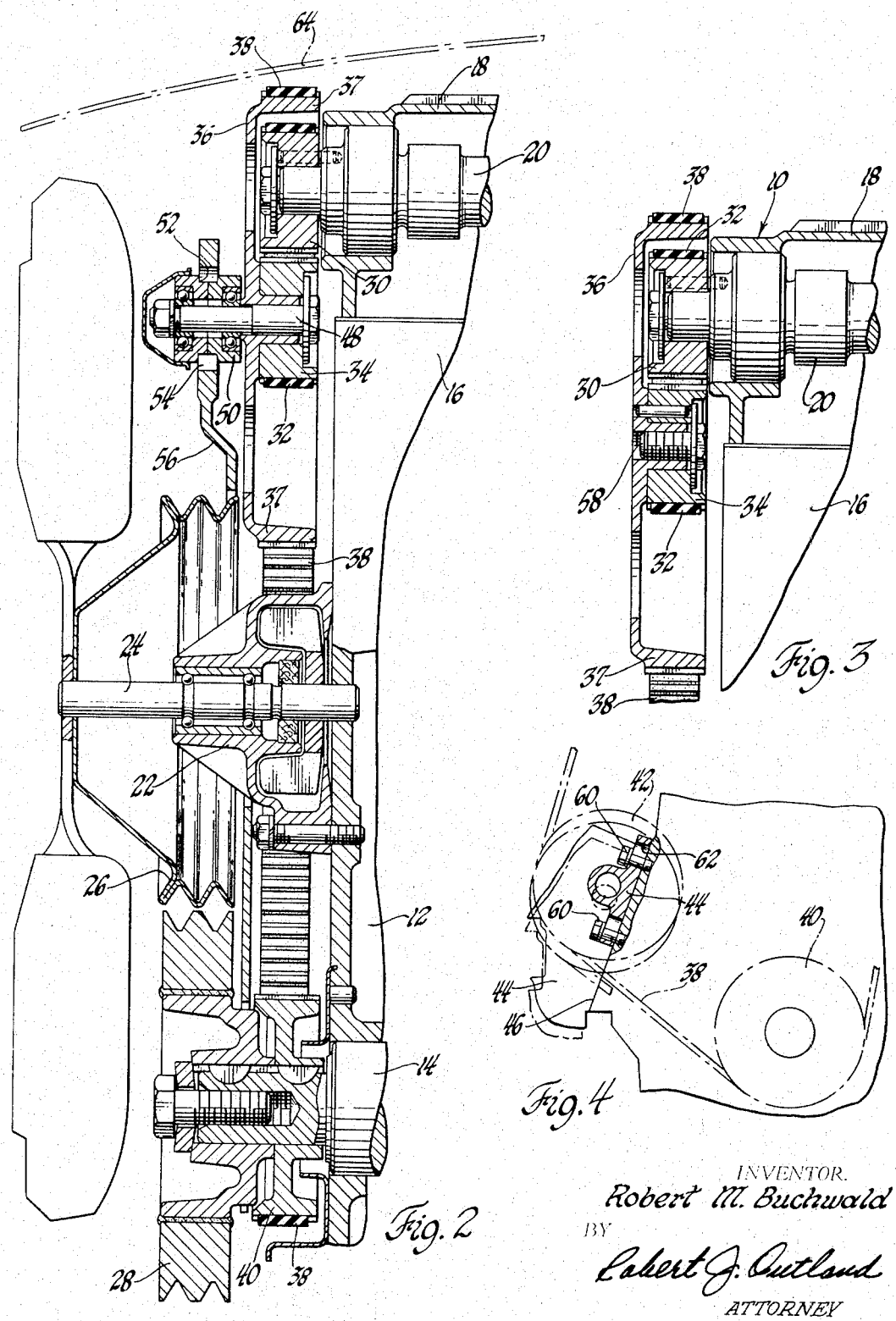

United States Patent Office 3,361,000
Patented Jan. 2, 1968

3,361,000
COMPACT SPEED CHANGE DRIVE
Robert M. Buchwald, Birmingham, Mich., assignor to General Motors Corporation, Detroit, Mich., a corporation of Delaware
Filed Dec. 21, 1965, Ser. No. 515,418
10 Claims. (Cl. 74—219)

This invention relates to compact speed change drive arrangements and, in its more specific aspects, to belt or chain drive arrangements for driving the overhead camshaft of a four-cycle internal combustion engine so as to give a low engine profile and require a minimum of space for installation on the engine.

These advantages are attained by providing dual belt or chain drive means between the engine crankshaft and camshaft with the necessary 2:1 speed reduction being accomplished between a crankshaft driven pulley and an intermediate pulley. Within the rim of the intermediate pulley is located a smaller intermediate pulley coaxial therewith and a camshaft-mounted driven pulley, both being connected by a secondary driving belt.

The common center of the intermediate pulleys lies generally between the axis of the crankshaft and camshaft so that the intermediate pulley may be retained in position by only the forces on the belt acting in generally opposite directions. Thus, means provided to adjust the tension of the outer belt will additionally adjust the tension of the inner belt at the same time. All the pulleys are coplanar so that the drive is substantially as narrow as would be a single belt drive. Furthermore, the large intermediate pulley is offset from the camshaft axis with its rim lying close to the rim of the camshaft-mounted pulley so that a drive of low height is provided.

In internal combustion engines of the four-stroke cycle type, it is common practice to have a camshaft driven from the crankshaft at one-half crankshaft speed. To accomplish this, it is known to provide a crankshaft-mounted pulley connected by a chain or toothed belt to a camshaft-mounted pulley which, in order to obtain the necessary speed reduction, is made twice the diameter of the crankshaft-mounted pulley. When such an arrangement is applied to an engine of the overhead camshaft type, the camshaft-mounted pulley generally extends above other portions of the engine, increasing the engine height and making difficult the mounting of the engine in close quarters such as under the low hood lines of modern automotive vehicles.

An alternative chain drive arrangement has been proposed wherein a pair of coaxial intermediate pulleys are mounted midway between the crankshaft and camshaft pulleys with the speed reduction being made between the crankshaft pulley and a large intermediate pulley. The drive then passes to a smaller intermediate pulley which permits the use of a small pulley on the camshaft so as to lower engine height. This, however, results in the width of the drive being increased substantially so as to take up more than twice the width it would otherwise require at the front of the engine.

The present invention proposes an arrangement whereby the desirable low engine profile is obtained with a dual belt drive having the belts lying in the same plane so as to avoid any substantial increase in width over that of a conventional two-pulley drive. This arrangement has the advantages previously mentioned, as well as additional features which will be apparent from the following description and drawings of two embodiments of the invention selected for the purpose of illustration and in which:

FIGURE 2 is a cross-sectional view taken along the plane generally indicated by the line 2—2 of FIGURE 1;

FIGURE 3 is a fragmentary cross-sectional view showing an alternative embodiment of the invention; and FIGURE 4 is a fragmentary end elevation indicating a method of adjusting belt tension.

Figure 1:
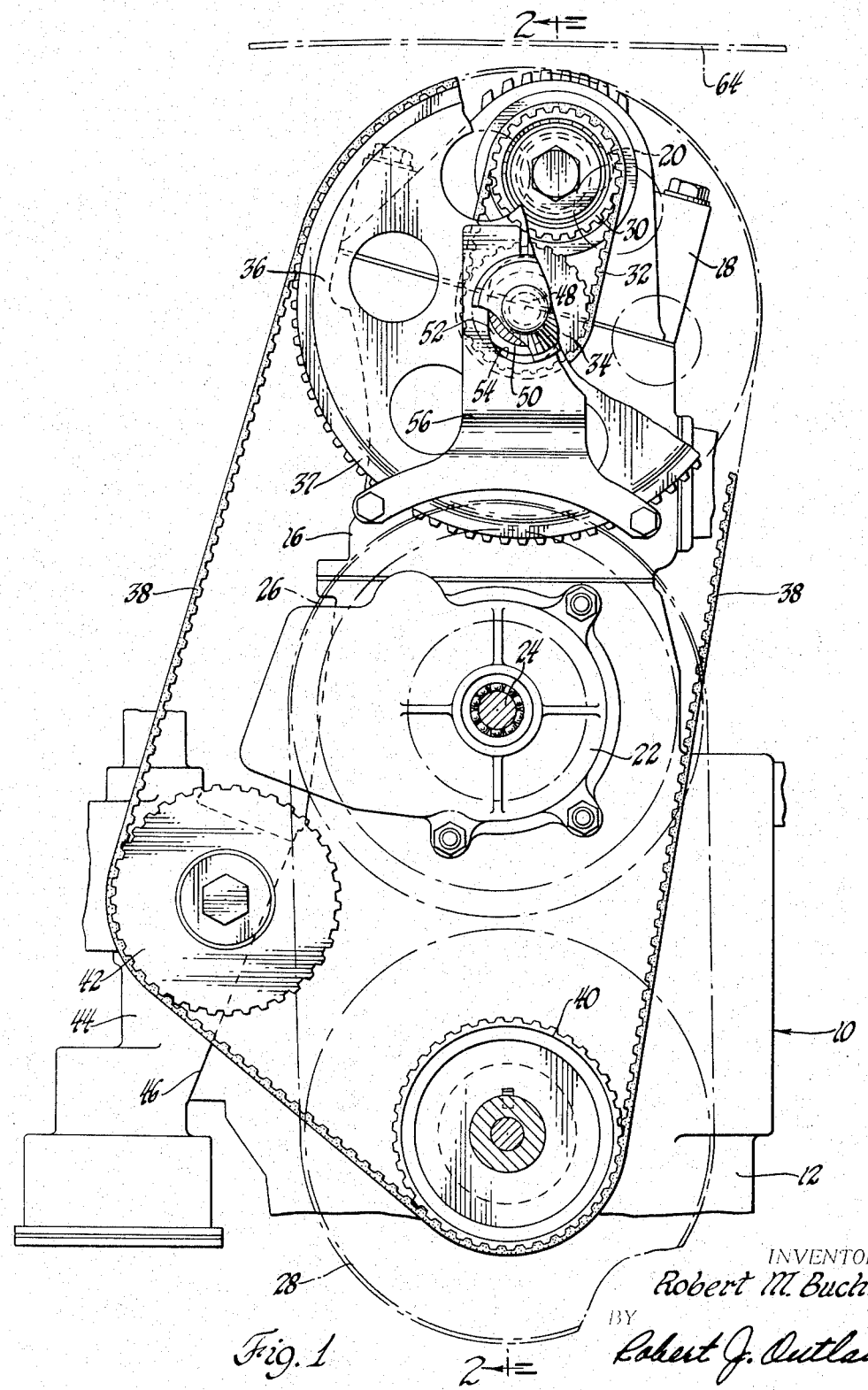
FIGURE 1 is an end elevation partially in section of an internal combustion engine utilizing a drive arrangement according to the invention.

Referring now to FIGURES 1 and 2 of the drawings, numeral 10 generally indicates an internal combustion engine of the four-stroke cycle type and having a cylinder block 12 rotatably carrying a crankshaft 14. A cylinder head 16 is carried along the upper surface of the cylinder block and, in turn, supports a camshaft carrier and cover 18 which rotatably supports an overhead camshaft 20 extending parallel to the crankshaft and located adjacent the top portion of the cover 18.

Centrally mounted on the front face of the cylinder block 12 is a water pump housing 22 which carries a combination fan and water pump shaft 24, driven by a pulley 26 connected through belts, not shown, to a crankshaft-mounted pulley 28.

A cog belt drive arrangement is provided between the crankshaft and the camshaft to give the camshaft at one-half crankshaft speed and in timed relation therewith. This arrangement comprises a driven toothed wheel or pulley 30 secured to the end of camshaft 20 and in driving relationship therewith. A relatively short toothed, or cog, belt 32 connects pulley 30 with an intermediate toothed pulley 34 having the same diameter and number of teeth as pulley 30. Belt 32 is sufficiently long to permit pulleys 30 and 34 to rotate without interfering with one another, but the spacing between pulleys is preferably kept small to attain a compact assembly.

Pulley 34 is mounted coplanarly, coaxially and in driving relationship with a relatively large intermediate toothed pulley 36 which has a rim portion 37 completely surrounding the portion of the drive comprising pulleys 30 and 34 and belt 32. Pulley 36 is connected through a second toothed belt 38 with a toothed pulley 40 carried on the end of the crankshaft 14 inwardly of pulley 28. Pulley 40 is one-half the diameter and contains half the number of teeth of pulley 36 so that the required 2:1 speed reduction between the crankshaft and camshaft may be obtained.

An idler pulley 42 engages one run of belt 38 between pulleys 40 and 36 and is carried on a housing 44 which is slidably adjustable along an angular face 46 of the cylinder block to increase or decrease the tension of the belts. Idler pulley 42 may be toothed and receive power from the crankshaft through belt 38 to drive various accessories mounted in the housing 44.

In the embodiment of FIGURES 1 and 2, pulleys 34 and 36 are secured together and to a shaft 48 which is rotatably mounted within a bearing housing 50. Housing 50 includes grooved portions 52 which are slidably retained by the edges of an elongated slot 54 formed within a supporting bracket 56. This construction permits vertical movement of the shaft 48, but not horizontal movement thereof. Thus, the position of the axis of pulleys 34 and 36 in this construction is determined partially by the bracket slot 54 and partially by the opposing forces on the pulley assembly caused by the tensions of belt 38 and 32 which act in generally opposite directions. With this construction, it should be clear that when the tension of belt 38 is increased by sliding idler pulley 42 downwardly, the increased downward force on pulley 36 moves the axis of the concentric pulleys 34, 36 slightly downward, thus, also increasing the tension on belt 32.

The embodiment of FIGURE 3 differs from that of FIGURES 1 and 2 in that pulleys 34 and 36 are secured together by means such as bolt 58 and no mounting shaft or supporting bracket is used. Thus, the concentric pulleys 34, 36 are positioned completely by the opposing tension forces of belts 38 and 32. In this case, as in the arrangement of FIGURES 1 and 2, the tension on both belts is adjustable by adjustment of the idler pulley 42. This adjustment may be made, as indicated in FIGURE 4, by loosening bolts 60 and sliding housing 44 along face 46, slots 62 being provided in the housing to permit such adjustment.

The foregoing description and drawings disclose a camshaft drive system which has the desired low profile in that the large pulley 36 does not extend substantially above the highest point of cover 18 so that sufficient clearance is provided for mounting the engine within a low engine hood as indicated by the broken lines 64. In addition, the dual belt drive is arranged so that all the pulleys are in the same plane with the secondary drive portions constituting pulleys 30 and 34 and belt 32 totally encompassed within the rim of large pulley 36 so the drive is not substantially wider than a conventional single belt drive.

While the invention has been presented by reference to two embodiments of drive means for use in driving the camshaft of an internal combustion engine, it is apparent that, in its broader aspects, it is applicable to other drive applications and it is therefore intended to cover such changes and modifications as might be made by one skilled in the art within the spirit and scope of the invention as defined by the following claims.

I claim:
1. Speed change drive means comprising
   a driving pulley mounted for rotation about a fixed axis,
   a driven pulley mounted for rotation about a fixed axis spaced from said first mentioned fixed axis,
   a pair of concentrically disposed pulleys operatively connected together in driving relationship and having an axis generally intermediate the said fixed axes, all of said pulleys lying in substantially the same plane and the outer of said concentric pulleys completely surrounding one of said driving and driven pulleys,
   an inner belt-like driving member connecting the inner of said concentric pulleys with said one pulley and
   an outer belt-like driving member connecting the outer of said concentric pulleys with the other of said driving and driven pulleys.

2. Drive means as defined in claim 1 wherein the axis of said concentric pulleys is movable and its position is determined, at least in part, by tension on said belt-like driving members.

3. Drive means as defined in claim 2 and further comprising tension adjusting means bearing against one of said belt-like driving members and movable to adjust the tension thereof, such tension adjusting movement being effective also to adjust the tension of the other of said belt-like driving members by virtue of the movability of said concentric pulley axis.

4. Drive means as defined in claim 3 wherein said concentric pulleys are completely unrestrained in their plane of rotation other than through their connection with said inner and outer belt-like driving members, said concentric pulleys being completely positioned and supported by said driving members.

5. Drive means as defined in claim 3 and further comprising guide means operatively limiting movement of said concentric pulley axis to a predetermined linear path.

6. Speed change drive means as defined in claim 1 in combination with an internal combustion engine having a crankshaft and a camshaft, said driving pulley comprising a toothed wheel connected with the crankshaft and said driven pulley comprising a toothed wheel carried on and drivingly connected with the camshaft, each of said concentric pulleys comprising a toothed wheel with said outer concentric pulley surrounding said driven pulley and said belt-like driving members including tooth receiving portions throughout their lengths to receive the teeth of said pulley wheels so as to provide a positive indexed drive between the crankshaft and the camshaft.

7. The combination of claim 6 wherein said camshaft is carried for rotation adjacent an outer surface of said engine, the perimeter of said outer concentric pulley lying close to the surface of said inner driving member where it engages said driven pulley so as to minimize projection of said drive means beyond said engine outer surface.

8. The combination of claim 7 wherein the axis of said concentric pulleys is movable and its position is determined, at least in part, by tension on said belt-like driving members.

9. The combination of claim 8 and further comprising a tension adjusting pulley bearing against said outer belt-like driving member and movable to adjust the tension thereof, such tension adjusting movement being effective also to adjust the tension of said inner belt-like driving member by virtue of the movability of said concentric pulley axis.

10. The combination of claim 9 and further comprising guide means operatively limiting movement of said concentric pulley axis to a predetermined linear path.

References Cited

UNITED STATES PATENTS

| 2,477,369 | 7/1949 | Goodwyn | 74—219 X |
| 2,664,757 | 1/1954 | Shaw | 74—242.12 X |
| 3,216,267 | 11/1965 | Dolza | 74—219 |
| 3,217,552 | 11/1965 | Daub | 74—219 |
| 3,285,085 | 11/1966 | Graham | 74—242.14 |

FRED C. MATTERN, Jr., *Primary Examiner.*

J. A. WONG, *Assistant Examiner.*